United States Patent
Buchholz et al.

(10) Patent No.: US 9,778,370 B2
(45) Date of Patent: Oct. 3, 2017

(54) METHOD FOR DETERMINING A SPATIALLY RESOLVED EXTENT OF ERROR FOR POSITION FINDING WITH A GNSS

(71) Applicant: Audi AG, Ingolstadt (DE)

(72) Inventors: Jan Buchholz, Ergolding (DE); Sebastian Engel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/123,819

(22) PCT Filed: Jul. 17, 2015

(86) PCT No.: PCT/EP2015/001479
§ 371 (c)(1),
(2) Date: Sep. 6, 2016

(87) PCT Pub. No.: WO2016/012089
PCT Pub. Date: Jan. 28, 2016

(65) Prior Publication Data
US 2017/0016994 A1    Jan. 19, 2017

(30) Foreign Application Priority Data
Jul. 25, 2014 (DE) .................. 10 2014 011 092

(51) Int. Cl.
*G01S 19/40*    (2010.01)
*G01S 19/45*    (2010.01)
(Continued)

(52) U.S. Cl.
CPC ............. *G01S 19/45* (2013.01); *G01S 19/40* (2013.01); *G01S 19/48* (2013.01); *G01S 19/49* (2013.01); *G01S 19/03* (2013.01)

(58) Field of Classification Search
CPC .......... G01S 19/40; G01S 19/45; G01S 19/48; G01S 19/49
(Continued)

(56) References Cited

U.S. PATENT DOCUMENTS 8,041,472 B2    10/2011    Kobori et al.
8,370,028 B2    2/2013    Yamada
(Continued)

FOREIGN PATENT DOCUMENTS

CM    101360971 A    2/2009
CN    101625406 A    1/2010
(Continued)

OTHER PUBLICATIONS

Reza, Dec. 12, 2005, Dartmouth College, ThC14.3, p. 1.*
(Continued)

*Primary Examiner* — Harry Liu
(74) *Attorney, Agent, or Firm* — Sterne, Kessler, Goldstein & Fox P.L.L.C.

(57) ABSTRACT

A method for determining a spatially resolved extent of error for position finding with a global navigation satellite system for a target area of interest using field data from a plurality of field apparatuses, particularly motor vehicles, each having a receiver for the global navigation satellite system and which are at least intermittently situated in the target area, comprising the following steps: ascertainment by the field apparatuses of at least one field data record comprising a current GNSS position in the target area and an error value associated with said position, transmission of the field data records to a central computation device, updating of an error map containing the extents of error for various positions and/or subareas of the target area by statistical evaluation of the field data records in the central computation device.

11 Claims, 2 Drawing Sheets

(51) Int. Cl.
*G01S 19/48* (2010.01)
*G01S 19/49* (2010.01)
*G01S 19/03* (2010.01)

(58) Field of Classification Search
USPC .................................................. 342/357.23
See application file for complete search history.

(56) References Cited

U.S. PATENT DOCUMENTS

| | | | | |
|---|---|---|---|---|
| 8,374,783 | B2* | 2/2013 | Takac | A01B 79/005 |
| | | | | 340/988 |
| 8,442,791 | B2 | 5/2013 | Stählin | |
| 8,751,150 | B2 | 6/2014 | Stählin | |
| 2006/0189324 | A1 | 8/2006 | Anderson | |
| 2007/0250263 | A1 | 10/2007 | Yamada | |
| 2008/0228395 | A1 | 9/2008 | Kobori et al. | |
| 2010/0007552 | A1 | 1/2010 | Oda et al. | |
| 2010/0026567 | A1 | 2/2010 | Coatantiec et al. | |
| 2010/0121518 | A1 | 5/2010 | Tiernan et al. | |
| 2011/0161032 | A1 | 6/2011 | Stählin | |
| 2011/0169697 | A1* | 7/2011 | Ling | G01S 5/0045 |
| | | | | 342/451 |
| 2011/0241935 | A1 | 10/2011 | Miocinovic et al. | |
| 2013/0197800 | A1 | 8/2013 | Haran | |
| 2014/0100713 | A1* | 4/2014 | Dedes | G08G 1/163 |
| | | | | 701/1 |
| 2015/0192657 | A1 | 7/2015 | Engel | |
| 2015/0309181 | A1* | 10/2015 | Stahlin | G01S 19/22 |
| | | | | 342/357.51 |

FOREIGN PATENT DOCUMENTS

| | | | |
|---|---|---|---|
| CN | 101796375 | A | 8/2010 |
| CN | 203825672 | U * | 9/2014 |
| DE | 102007019309 | A1 | 10/2007 |
| DE | 102008012654 | A1 | 3/2009 |
| DE | 102008020446 | A1 | 3/2009 |
| DE | 102009046595 | A1 | 9/2010 |
| DE | 102010031351 | A1 | 1/2012 |
| DE | 112010001235 | T5 | 7/2012 |
| DE | 102012014397 | A1 | 1/2014 |
| EP | 2 144 078 | A1 | 1/2010 |

OTHER PUBLICATIONS

English-language abstract of German Patent Application Publication No. 102010031351 A1, published Jan. 19, 2012; 2 pages.
Jensen A.B.O. et al.: "Availability of GNSS for Road Pricing in Copenhagen," ION GNSS 18$^{th}$ International Technical Meeting of Satellite Division, Sep. 13-16, 2005; 11 pages.
Wanner Bill et al.: "Wide Area Augtnentation System Vertical Accuracy Assesment in Support of LPV200 Requirements," Navigation: Journal of the Institute of Navigation, vol. 55, No, 3, Fall 2008; 13 pages.
International Search Report and Written Opinion directed to related International Patent Application No. PCT/EP2015/001479, mailed Oct. 28, 2015, with attached English-language translation; 30 pages.
International Preliminary Report on Patentability directed to related International Patent Application No. PCT/EP2015/001479, mailed Jun. 30, 2016, with attached English-language translation; 41 pages.

* cited by examiner

METHOD FOR DETERMINING A SPATIALLY RESOLVED EXTENT OF ERROR FOR POSITION FINDING WITH A GNSS

TECHNICAL FIELD

The invention relates to a method for determining a spatially resolved extent of error for position finding with a global navigation satellite system (GNSS) for a target area of interest.

BACKGROUND

Global navigation satellite systems (GNSS) are already widely known in the prior art. GPS (Global Positioning System) is an example thereof. Here, on the basis of the signals received from several satellites, a current position is determined, for example, by means of a mobile telephone or a motor vehicle.

Especially in motor vehicles there are more and more vehicle systems that require the most exact possible determination of the current position of the motor vehicle. This relates particularly to vehicle systems in the field of motor-vehicle-to-motor-vehicle communication (c2c communication) and in the field of motor-vehicle-to-infrastructure communication (c2x communication). For this use, the precision of the GNSS position provided by conventional GNSS receivers is not sufficient, since the uncertainty is too high. Therefore, in the prior art, methods have already been proposed for improving the positional precision based on the use of a GNSS.

DE 10 2008 020 446 A1 relates to the correction of a vehicle position using distinctive points. Therein, it is proposed to detect distinctive points, that is to say landmarks, wherein the distinctive points are stored in a database in the vehicle together with associated exact GPS positions. Therefore, a correction of the position finding is possible on the basis of the data in the database.

However, this approach has the disadvantage that exact surveying of landmarks is exceedingly difficult and expensive. A comprehensive use of surveyed landmarks for improving the determination of the position via a GNSS is therefore currently not feasible. In addition, the precision of the GNSS receivers and thus of the GNSS positions determined by them is highly dependent on the environment, so that, for example, the precision on the highways where there is a free line-of-sight connection with the satellites is considerably higher than in the skyscraper canyons where the line of sight to the satellites is greatly limited or not at all directly possible. In the example of the skyscraper canyons, the GNSS signal, if it reaches the receiver at all, reaches it only by way of the so-called multipath propagation, which in turn enormously worsens the precision that can be achieved. Therefore, in such areas landmarks would be much more appropriate than in other areas.

BRIEF DESCRIPTION OF THE DRAWINGS/FIGURES

DETAILED DESCRIPTION

Figure 1:
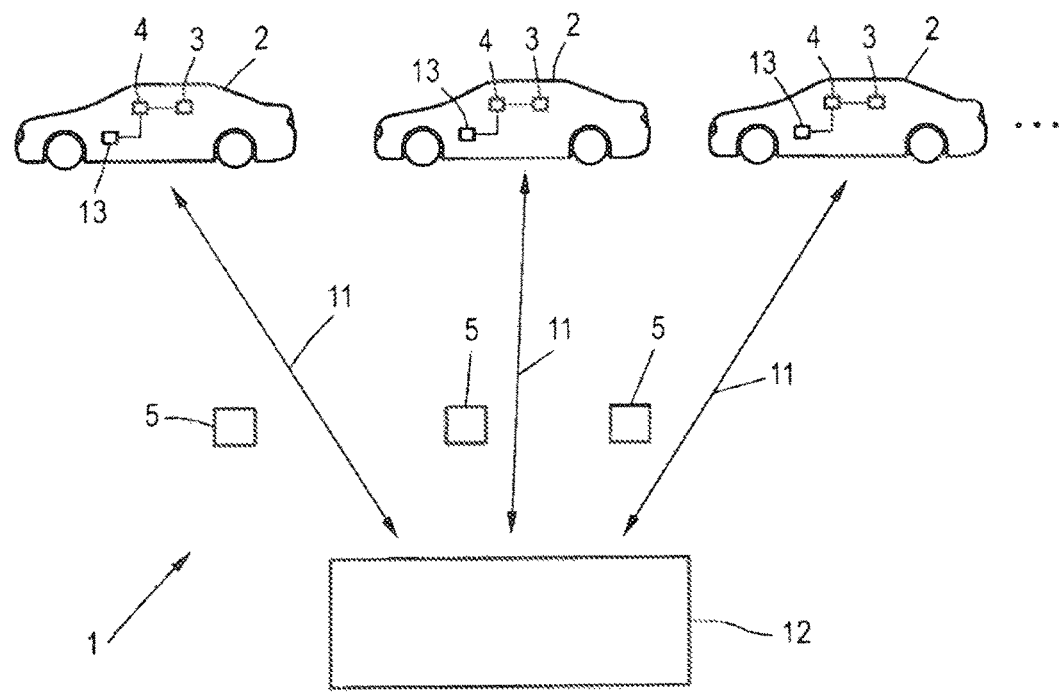
FIG. 1 illustrates a system for carrying out the method according to the present disclosure.

It is therefore the object of the invention, in particular for the preparation of an acquisition of landmarks for a database for the purpose of improving the position finding in a motor vehicle, to provide a robust possibility that can be implemented easily for the ascertainment of a site-dependent precision of the GNSS.

To achieve this object, according to the invention, a method is provided for determining a spatially resolved extent of error for position finding with a global navigation satellite system for a target area of interest using field data from a plurality of field apparatuses, particularly motor vehicles, each having a receiver for the global navigation satellite system and which are at least intermittently situated in the target area, comprising the following steps:

ascertainment of at least one field data record comprising a current GNSS position in the target area and an error value associated with said position, by the field apparatuses, transmission of the field data records to a central computation device, ascertainment and updating of an error map containing the extents of error for various positions and/or subareas of the target area, by statistical evaluation of the field data records in the central computation device.

According to the invention, it is thus proposed to use field apparatuses, in particular motor vehicles, that are already in operation and have a GNSS receiver, as probes so to speak, in order to collect data on how precisely position data can be ascertained via the GNSS, and at which positions or in which subareas into which the target area can be divided. Here, various selections of the target area and the subdivision thereof are conceivable, for example, certain states, sections of a digital map or the like. The target area can be subdivided, for example, by an indication in grid form of positions that stand representatively for conceivably more precise position indications in their environment, so that GNSS positions of the field data records can be associated with this position; naturally, by such a representation in grid form it is also possible, in particular, to subdivide the target area into subareas of equal size and/or shape, wherein verification is then carried out to determine whether the GNSS position of a field data record under consideration is located within the subarea. It is particularly preferable that the field apparatuses, as already indicated, are motor vehicles in conventional operation, which today usually already comprise a GNSS receiver, in particular a GPS receiver, which can be used in the context of the present invention for collecting precision data, by assembling corresponding field data records and sending them to the central computation device, preferably at least partially wirelessly, so that, therefore, the field apparatuses comprise suitable communication devices, in the case of motor vehicles, for example, motor-vehicle-to-infrastructure communication devices and/or possibilities for setting up communication connections via the Internet and/or via a mobile radio network.

Via the method described here, areas with continuously poor GNSS precision can be identified. For a defined target area or concretely corresponding subareas, the error values obtained, which are contained in the field data records, are merged by means of a statistical evaluation, so that it becomes possible to establish whether, in a subarea or at certain positions in the target area, poor conditions for the achievable GNSS precision exist constantly. Thus, the error map can be used advantageously in order to prioritize a surveying of landmarks at positions and/or in subareas. This means that the error map can be used in order to indicate the areas in which landmarks are to be surveyed preferentially, which are to be used in a method as described in the DE 10 2008 020 446 A1 mentioned at the start, for example. By implementing the method according to invention, first of all those landmarks in the area of which the GNSS precision is greatly limited by the environment, for example, are surveyed and stored in a database, for example. As a result, the achievable GNSS precision in these areas is greatly improved, if, for the determination of the GNSS position, the landmarks are taken into consideration additionally, which in turn enables the implementation of functions in vehicle systems of a motor vehicle that rely on a comprehensive high position precision.

In an advantageous development of the method, field data records are ascertained only when the field apparatus is moving and/or in operation. In the case of an immobile field apparatus or a field apparatus that is not in operation, in particular, a motor vehicle, field data records would be delivered continuously from the same GNSS position (or, if variations in the determination occur, from adjacent GNSS positions of the same subarea). Although this may be acceptable for a statistical evaluation under certain circumstances, it requires computation and transmission power within the field apparatus, in particular, within the motor vehicle, without in fact contributing to the total coverage. Therefore, it is preferable that field data records are ascertained and transmitted only if the field apparatus is in operation and/or moving.

In a particularly advantageous design of the invention, as error value, an error value determined internally in the receiver, in particular, a dilution of precision (DOP), is used. Here, it was recognized that many known GNSS receivers themselves already make error values available in the context of their operation. Thus, no additional ascertainments are then needed; instead, parameters that are available in any case merely need to be assembled to form the field data records and transmitted, which enables a particularly inexpensive implementation of the method. The best known type of error value that is provided by GNSS receivers consists of the so-called DOP (dilution of precision) values. Therein, the effect of the geometry of the navigation satellites on the precision of the GNSS position is determined. Here, the geometric DOP is defined, for example, as the ratio of the error in the determined GNSS position to the error in the measured data, wherein different ways exist for determining DOP values, which are already widely known in the prior art. Therefore, the DOP values contain information on the satellite constellation that has an influence on the achievable GNSS precision. Here, for example, the lack of precision, and thus the DOP value, is greater if the satellites are close to one another or aligned after one another in a direction.

It is also particularly preferable if, as error value, at least one error value ascertained in the context of dead reckoning is used, in particular an error ellipse. Dead reckoning is already known in the prior art and is based on a merged position finding, in which the proper motion of the field apparatus, in particular of the motor vehicle, is also included, which can be described, for example, by means of odometer data ascertained by means of an inertial sensor system. The resulting proper motion estimation is merged with the GNSS position, wherein it is known here as well how to continuously calculate error values in the merging process, which indicate a deviation between the GNSS position and the position based on the proper motion estimation. As is known in principle in the prior art, these error values can be combined to form so-called error ellipses. In the case of dead reckoning, such error ellipses also preferably represent error values contained in the field data record.

Thus, a particularly preferred design results if error values determined internally in the GNSS receiver, preferably at least one DOP, and error values derived from dead reckoning, in particular error ellipses, are both added to the field data record, so that said field data record contains different error indications, and the central computation device can carry out an improved statistical error analysis.

Advantageously, the recording for later transmission and/or the transmission of a field data record can be actuated in a triggered manner and/or occur cyclically. After more frequent ascertainment of GNSS positions by GNSS receivers, very high data occurrence would exist, in particular, in the case of motor vehicles, if all the measurement points were in fact transmitted as field data record. Based on this, it is possible, for example, to collect random samples defined by cycle intervals, wherein it is preferable, however, to select and to send, in a targeted manner, GNSS positions and associated error values as field data records, for the purpose of which a relevance criterion can be evaluated. Concretely, it is possible therefore to provide that the triggering occurs on the basis of a relevance criterion evaluating the error value, in particular, on the basis of the exceeding of a threshold value by the error value. In this manner, a threshold value for the error value is then finally determined, and, in the case of multiple error values optionally also multiple threshold values are determined, which describe(s) the level of precision up to which an acquisition by the central computation device is not needed. If the method according to the invention aims, for example, to prioritize the surveying of landmarks, areas in which the GNSS position is in any case sufficiently precise can be left out in the surveying, in order to avoid or keep low the expenses for ascertainment, transmission and evaluation. In the error map the areas with high error value in the end then appear as "hot spots" in a way, which can be allocated rapidly.

Preferably, in the context of the statistical evaluation, the temporal course of the error values to be associated with a position and/or a subarea is taken into consideration and/or a temporal low-pass filter is applied to the error values to be associated with a position and/or a subarea. By taking the temporal course into consideration as well, it is possible to establish whether, in a subarea or at a position, constantly poor conditions are present for the achievable GNSS precision, or whether, possibly, only a temporary disturbance exists, for example, due to weather influences and/or due to a temporarily negative satellite constellation. The mentioned filtering also makes it possible to remove to the extent possible individual error measurements of the error values, that is to say outliers, from further consideration. Naturally, it is also possible here to use other methods that are known in principle, in order to find so-called "outliers" in the statistical evaluation and remove them from consideration.

In concrete terms, it can be provided that, for example, for a limited time period, in particular time period of less than one day, error values at a position and/or in a subarea that deviate from a mean value of another longer time period outside of a tolerance interval are rejected. This makes it possible to remove the described temporary, rare, negative effects on the GNSS precision, for example, weather phenomena, from further consideration, and thus obtain overall a reliable value for the actual GNSS precision at the position and/or in the subarea.

In an advantageous development, it can be provided that, as part of the field data records, at least one receiver datum characterizing the receiver used for the ascertainment of the GNSS position is also transmitted. This means that the field data record can also contain information on which kind or which type of GNSS receiver was used for ascertaining the GNSS position. For example, an apparatus type ID of the GNSS receiver can be added as receiver datum, so that it is possible to differentiate different receivers. Then, it can be provided that a classification of the error values occurs on the basis of the receiver datum and error values belonging to a class are statistically evaluated separately. In the context of the invention, a type of filtering based on apparatus type for the receiver can also be carried out, so that influences can be analyzed for precision by different GNSS receivers. For example, it can then be established whether certain GNSS receivers that occur rather rarely are the only ones presenting problems in certain subareas and/or at certain positions in the target area and the like, so that a prioritization can be further refined, for example.

In general, a system for determining a spatially resolved extent of error for position finding with a global navigation satellite system for a target area of interest using field data from a plurality of field apparatuses, particularly motor vehicles, each having a receiver for the global navigation satellite system and which are situated at least intermittently in the target area is conceivable, wherein, a control apparatus of the field apparatuses is designed for ascertaining at least one field data record comprising a current GNSS position in the target area and an error value associated with them and for transmitting it to a central computation device, wherein the central computation device is designed first of all for ascertaining from a base stock of data an error map containing the extents of error for different positions and/or subareas of the target area, by statistical evaluation of the field data records and for updating it on the basis of newly received field data records. The system comprises therefore field apparatuses, for example, a fleet of motor vehicles of appropriate design, and the central computation device. The central computation device can be a server comprising one or more computers, and which is connected via the Internet and/or via a mobile radio network to the field apparatuses, in particular to the motor vehicles.

Figure 2:
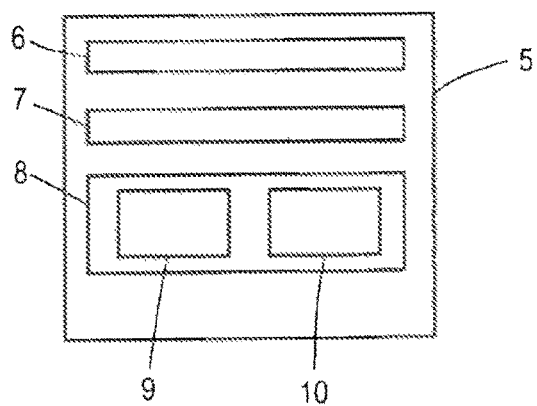
FIG. 2 illustrates a diagrammatic representation of a field data record according to the present disclosure.

Additional advantages and details of the present invention are obtained from the embodiment examples described below as well as in reference to the drawings. The drawings show:

FIG. 1 a system for carrying out the method according to the invention,

FIG. 2 a diagrammatic representation of a field data record, and

Figure 3:
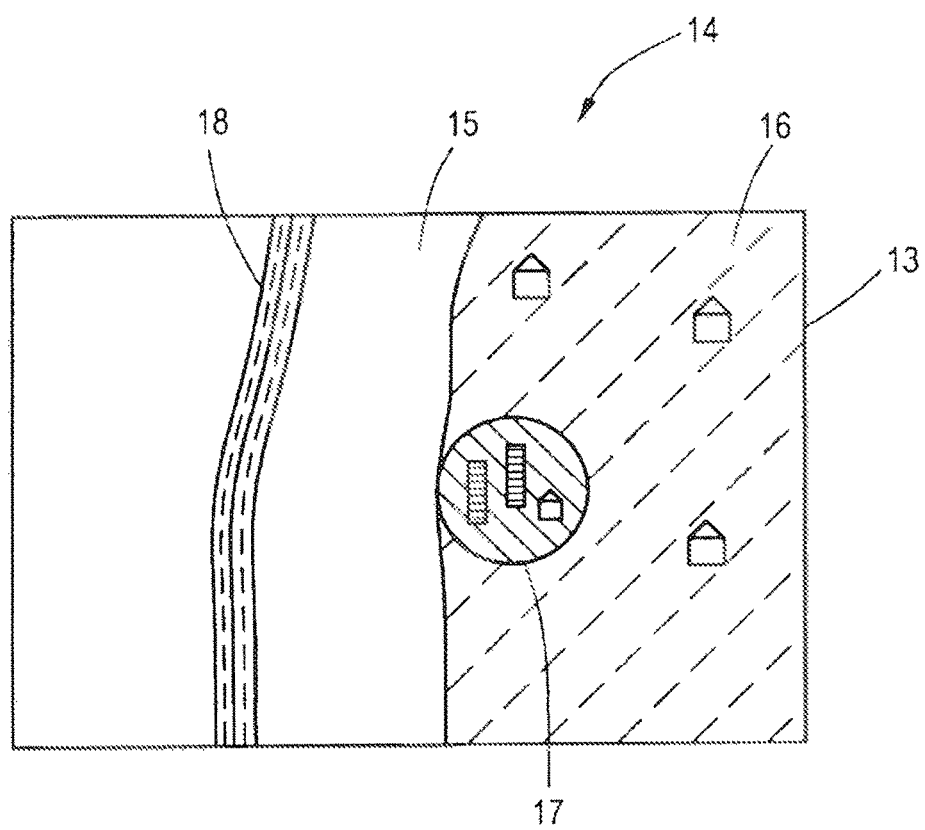
FIG. 3 illustrates a diagrammatic sketch of an error map according to the present disclosure.

FIG. 3 a diagrammatic sketch of an error map.

FIG. 1 shows a diagrammatic sketch of a system 1, in which the method according to the invention can be carried out. This system comprises a fleet of motor vehicles 2, which are used as field apparatuses, each comprising a GNSS receiver 3 for a global navigation satellite system, here GPS. The GNSS receivers 3 provide, in addition to a current GNSS position ascertained from the signals received by various satellites, an associated error value, namely a dilution of precision (DOP). These values are transmitted to a control apparatus 4 of the respective motor vehicle, which in addition also performs a so-called dead reckoning in which a merging of a proper motion estimation obtained from the data on the proper motion of the motor vehicle 2 for the current position and of the GNSS position occurs, for the purpose of which holometric data of an inertial sensor system—not further represented here—of the respective motor vehicle 2 is used. In these calculations, error values are also produced, which are combined in the present case in an error ellipse.

The control apparatus 4 is then designed for assembling a field data record 5 represented diagrammatically in FIG. 2, which, in the present case, contains receiver data 6 describing the type of the GNSS receiver 3, the current GNSS position 7 and error values 8 that are associated with the GNSS position 7. In the present case, as error values 8, the dilution of precision 9 and the error ellipse 10 are used.

The ascertainment of field data records 5 here occurs only if the respective motor vehicle 2 is in operation at that particular time, in particular if it is moving. In the process, a field data record 5 does not need to be established for each GNSS position recorded; instead, it can be sufficient to do this cyclically and/or after the evaluation of a relevance condition, for example, if a predetermined lack of precision of a threshold value for the error values has been exceeded.

The field data records 5 are transmitted via a communication connection 11 to a central computation device 12, for example, a server. To this end, a communication device 13 of the motor vehicles 2 is actuated accordingly by the control apparatus 4. The transmission occurs at least partially wirelessly and via a mobile radio network and the Internet.

In the central computation device 12, the field data records 5 are collected. All the field data records 5 here relate to a certain target area which is to be checked with regard to the precision of the GNSS ascertainment, for example, relate to a certain state, wherein the corresponding selection as to whether or not a field data record 5 should be established can also be included in the decision in the motor vehicle 2. Naturally, it is also possible to sort out field data records 5 that do not concern the target area. For the establishment of an error map, the field data records 5 are associated with subareas in accordance with the GNSS position 7 contained in them; however, at the same time, the field data records 5 are also sorted into different classes independently of the receiver data 6, so that, further on, it can be established, for example, whether precision problems are present only with certain receivers or the like.

The data is then statistically evaluated by the computation device 12, wherein a separate statistical evaluation occurs for the data of the different classes. In the process, the error values of different motor vehicles 2 are merged for the same subareas, so that a combined extent of error indicating the general precision in the subarea is obtained. In the process, the temporal course of the error values is also considered, for example, in order to exclude temporary, rare effects, for example, poor weather conditions, that result only intermittently in a limited precision.

With regard to outliers, an analysis for the known types can also occur. Here, it should be noted that embodiments are naturally also conceivable in which the evaluation also takes into consideration different weather conditions, wherein the computation device 12 can download, for example, corresponding weather data for the subarea from the Internet. Evidently, the evaluation can then occur to any desired degree of precision.

FIG. 3 shows, for example and only to illustrate the principle, a section 13 of an error map 14, which can be obtained by the described method. Therein, three partial areas 15, 16, 17 of the target area can be seen, which are highlighted with different crosshatchings, therefore comprising extents of error in different precision ranges. Such partial areas 15, 16, 17 are usually composed of several subareas that can be defined, for example, and in which a grid is placed over the target area or the like.

In the partial area 15, a highway 18 leads through open terrain, so that excellent precision exists here. The partial area 16 is slightly developed, resulting in a slight lowering of the precision. Exceedingly poor precision exists in the partial area 17, in which skyscrapers are located, which shield the satellites and/or are responsible for reflected signals that are received.

Such an error map 14 can be used, for example, in order to establish the priority with which and the subareas in which landmarks should be surveyed. Landmarks surveyed in this manner with a high-precision GNSS position can be stored in a database and downloaded in areas with low precision by motor vehicles 2, in order to improve the precision of the location determination there.

The invention claimed is:

1. A method for determining a spatially resolved extent of error for position finding with a global navigation satellite system (GNSS) for a target area of interest using field data from a plurality of motor vehicles, each of the plurality of motor vehicles having GNSS receiver and which are at least intermittently situated in the target area, the method comprising:
determining, by the plurality of motor vehicles, a plurality of field data records that each comprise a current GNSS position in the target area and an error value associated with the current GNSS position;
transmitting the plurality of field data records to a central computation device; and
updating an error map containing extents of error for various positions and/or subareas of the target area by statistical evaluation of the plurality of field data records in the central computation device,
wherein a temporal course of error values associated with one of the various positions and/or subareas of the target area is taken into consideration by the statistical evaluation, and/or a temporal low-pass filter is applied to the error values associated with the one of the various positions and/or subareas of the target area by the statistical evaluation.

2. The method of claim 1, wherein the plurality of field data records are determined only when the plurality of motor vehicles are moving.

3. A The method of claim 1, wherein the error value in one of the plurality of field data records is determined internally in the GNSS receiver of one of the plurality of motor vehicles as a dilution of precision.

4. The method of claim 1, wherein the error value in one of the plurality of field data records is an error ellipse.

5. The method of claim 1, wherein the transmitting of the plurality of field data records to the central computation device is triggered based on a relevance criterion.

6. The method of claim 5, wherein the relevance criterion is the error values of the plurality of field data records exceeding a threshold value.

7. The method of claim 1, further comprising:
rejecting error values associated with the one of the various positions and/or subareas of the target area that deviate from a mean value of another longer term period by a tolerance interval.

8. The method of claim 1, wherein each of the plurality of field data records further comprises a receiver datum characterizing the GNSS receiver of one of the plurality of motor vehicles used to determine the current GNSS position in the field data record.

9. The method of claim 8, further comprising:
for each of the plurality of field data records, classifying the error value associated with the current GNSS position in the field data record into one of a plurality of classes based on the receiver datum in the field data record,
wherein the statistical evaluation separately evaluates the error values in the plurality of field data records belonging to different ones of the plurality of classes.

10. The method of claim 1, further comprising:
evaluating the error map to prioritize surveying of landmarks at the various positions of the target area and/or in the various subareas of the target area.

11. The method of claim 1, wherein the transmitting of the plurality of field data records to the central computation device is cyclically triggered.

* * * * *